United States Patent
Chen et al.

(10) Patent No.: US 7,254,821 B2
(45) Date of Patent: Aug. 7, 2007

(54) DUSTCOVER DEVICE FOR DATA STORAGE DEVICES

(75) Inventors: Yun-Lung Chen, Tu-Cheng (TW); Quan-Guang Du, ShenZhen (CN); Chang-Jiang Hou, ShenZhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 435 days.

(21) Appl. No.: 11/022,499

(22) Filed: Dec. 23, 2004

(65) Prior Publication Data

US 2005/0240951 A1  Oct. 27, 2005

(30) Foreign Application Priority Data

Apr. 22, 2004 (CN) ......................... 2004 2 0045286

(51) Int. Cl.
*G11B 17/04* (2006.01)
(52) U.S. Cl. .................................... 720/655
(58) Field of Classification Search ............... 720/655, 720/601, 602, 647, 649; 360/99.02, 99.06, 360/97.01; 361/683, 684, 685
See application file for complete search history.

(56) References Cited

U.S. PATENT DOCUMENTS 5,586,003 A * 12/1996 Schmitt et al. ............. 361/683
5,924,782 A    7/1999 Park
6,028,832 A *  2/2000 Hojo et al. ................ 720/647
6,122,140 A *  9/2000 Sato ........................ 360/99.02
6,324,147 B2* 11/2001 Kanatani et al. ........... 720/647
6,650,609 B2* 11/2003 Omori et al. ............... 720/649
2004/0184228 A1* 9/2004 Minaguchi et al. ......... 361/683

FOREIGN PATENT DOCUMENTS

CN     2344841 Y    10/1999
CN     1132172 C    12/2003

* cited by examiner

*Primary Examiner*—Tianjie Chen
(74) *Attorney, Agent, or Firm*—Morris Manning & Martin LLP; Tim Tingkang Xia, Esq.

(57) ABSTRACT

A dustcover device for protecting an optical disk drive (20) having a tray (22) includes a bezel (30), a dustcover member (40) and a coil spring (50) mounted to between the bezel and the dustcover member for driving the dustcover to move upwardly to an upper position vertically. The bezel defines an opening (320) and a plurality of receiving grooves (324). The dustcover member comprises a dustcover (42) movably mounted to the bezel and a frame (44). The frame is rotatablely attached to the bezel, for driving the dustcover to slide downwardly to a lower position along the receiving grooves of the bezel. When the dustcover is in the upper position, the dustcover is received in the opening of the bezel. When the dustcover is in the lower position, the opening is open for the tray sliding into or out of the bezel.

22 Claims, 5 Drawing Sheets

DUSTCOVER DEVICE FOR DATA STORAGE DEVICES

CROSS-REFERENCE TO RELATED APPLICATIONS

This application is related to a U.S. patent application Ser. No. 10/977,812 entitled "ELECTRONIC APPLIANCE AND ENCLOSURE THEREOF", recently filed with the same assignee as the instant application and with. The disclosure of the above identified application is incorporated herein by reference.

BACKGROUND OF THE INVENTION

1. Field of the Invention

The present invention relates to dustcover devices for data storage devices, and particularly to a dustcover device having a dustcover that protects a data storage device from dust.

2. Description of Prior Art

Data storage devices, such as optical disk drives, are installed in a computer enclosure for communication and handling data. An optical disk drive comprises a case and a tray received in the case. The tray can accomodate an optical disk therein; and read data from the optical disk. A front bezel is positioned before the optical disk drive. An opening is defined in the front bezel. The tray can be moved into or out of the case through the opening of the front bezel.

A dustcover is often mounted to the front bezel to envelop the opening, for preventing dust going into the computer enclosure. CN Pat. Nos. 98108816.3 and 98220678.X disclose some designs related to this dustcover. Referring to FIGS. 6 and 7, a dustcover device described in CN Pat. No. 98220678.X comprises a front bezel 10 and a dustcover member 14. An optical disk drive having a tray 12 is mounted behind the front bezel 10. The dustcover member 14 comprises a dustcover 140, a pair of axes 142 installed in the front bezel 10 to support the dustcover 140 and a coil spring 144 mounted between the dustcover 140 and the front bezel 10. The dustcover 140 is pivotally mounted to the front bezel 10, and can rotate round the axes 142. When the tray 12 slides out of the optical disk drive, the dustcover member 14 is rotated to a lock state so that the dustcover 140 is open to allow the tray 12 moving and extending through. When the tray 12 slides into the optical disk drive, the dustcover member 14 is rotated to an unlocked state so that the dustcover 140 is closed. However, the dustcover 140 includes a protruding part which extends out of the front bezel 10 whether the dustcover 140 is open or closed so that the dustcover 140 is prone to damage in transportation or in use due to any accidental impact. This contingency usually leads to a short life of the dustcover member 14 and an unpleasant appearance of the dustcover device.

A new dustcover device for data storage devices that overcomes the above-mentioned problems is desired.

SUMMARY OF THE INVENTION

An object of the present invention is to provide a dustcover device having a dustcover protected from any accidental damage.

In order to achieve the above object, a dustcover device in accordance with a preferred embodiment of the present invention is adapted for protecting an optical disk drive having a tray from dust. The dustcover device comprises a bezel, a dustcover member and a resilient member. The bezel defines an opening and a plurality of receiving grooves. The dustcover member comprises a dustcover movably mounted to the bezel and a frame engaging with the dustcover. The frame is rotatablely attached to the bezel, for driving the dustcover to slide downwardly to a lower position vertically along the receiving grooves of the bezel. The resilient member is mounted between the bezel and the dustcover member, for driving the dustcover to upwardly move to an upper position vertically. When the dustcover is in the upper position, the dustcover is received in the opening of the bezel for protecting the optical disk drive from dust. When the dustcover is in the lower position, the opening is open for the tray sliding into or out of the optical disk drive.

Other objects, advantages and novel features of the present invention will become more apparent from the following detailed description when taken in conjunction with the accompanying drawings, in which:

DESCRIPTION OF THE PREFERRED EMBODIMENT

Reference will now be made to the drawings to describe the present invention in detail.

Figure 1:
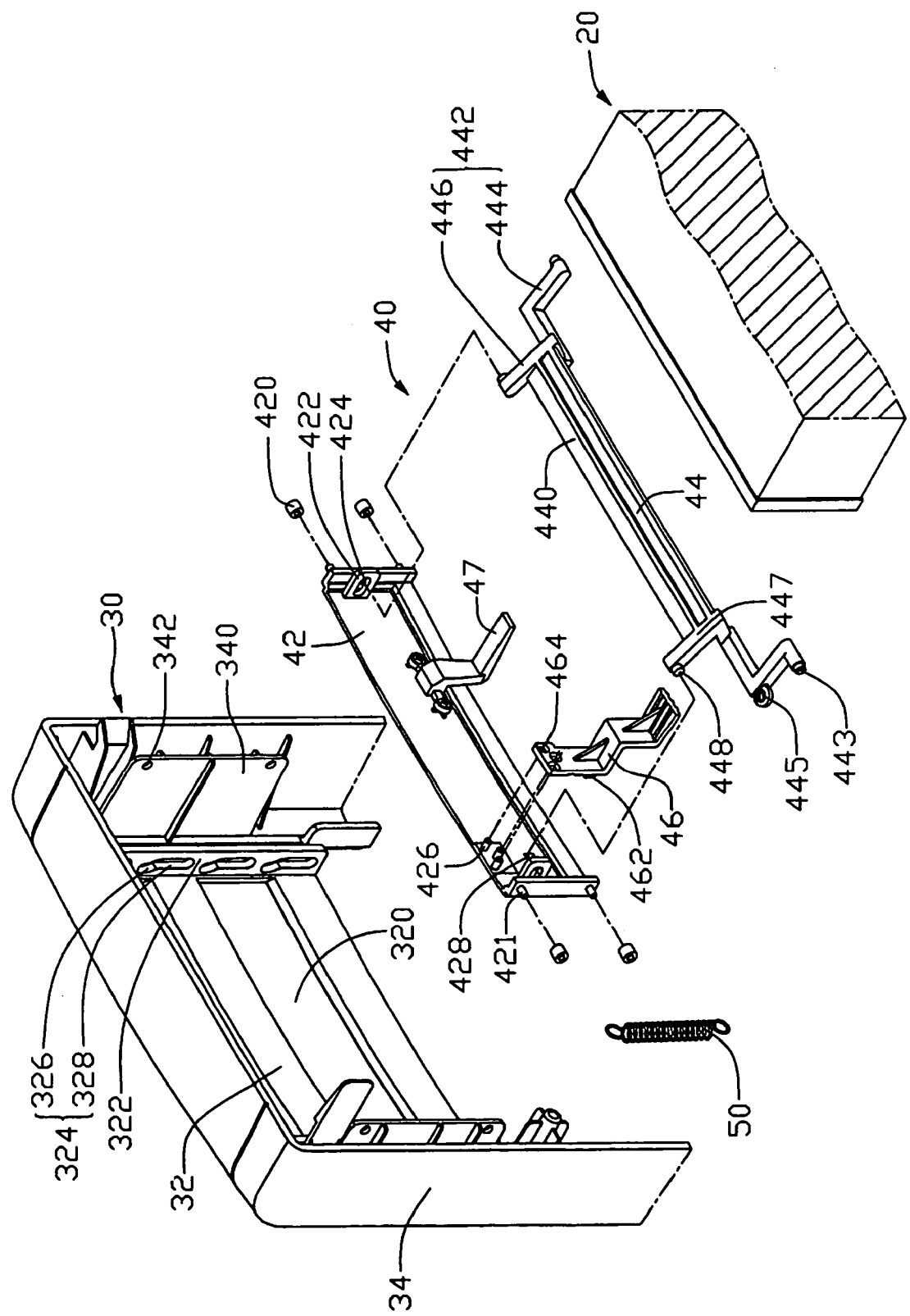
FIG. 1 is an exploded, isometric view of a dustcover device in accordance with a preferred embodiment of the present invention, together with an optical disk drive.

Referring to FIG. 1, a dustcover device of an electronic appliance in accordance with the preferred embodiment of the present invention is adapted for protecting an internal device of the electronic appliance like an optical disk drive 20 from dust. The dustcover device comprises a bezel 30 of an enclosure of the electronic appliance, a coil spring 50 and a dustcover member 40.

Figure 4:
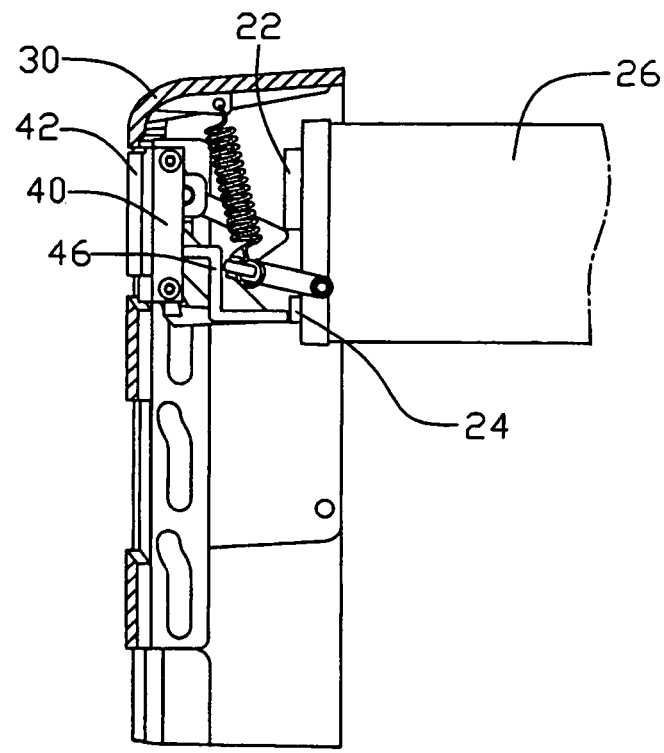
FIG. 4 is a partial cross-sectional view of FIG. 2, showing the dustcover device in a first position.

Referring to FIGS. 1 and 4, the optical disk drive 20 comprises a case 26, a first button 24 and a tray 22 for receiving an optical disk (not shown). The first button 24 is installed on a lower portion of the case 26, for turning on the tray 22.

Figure 3:
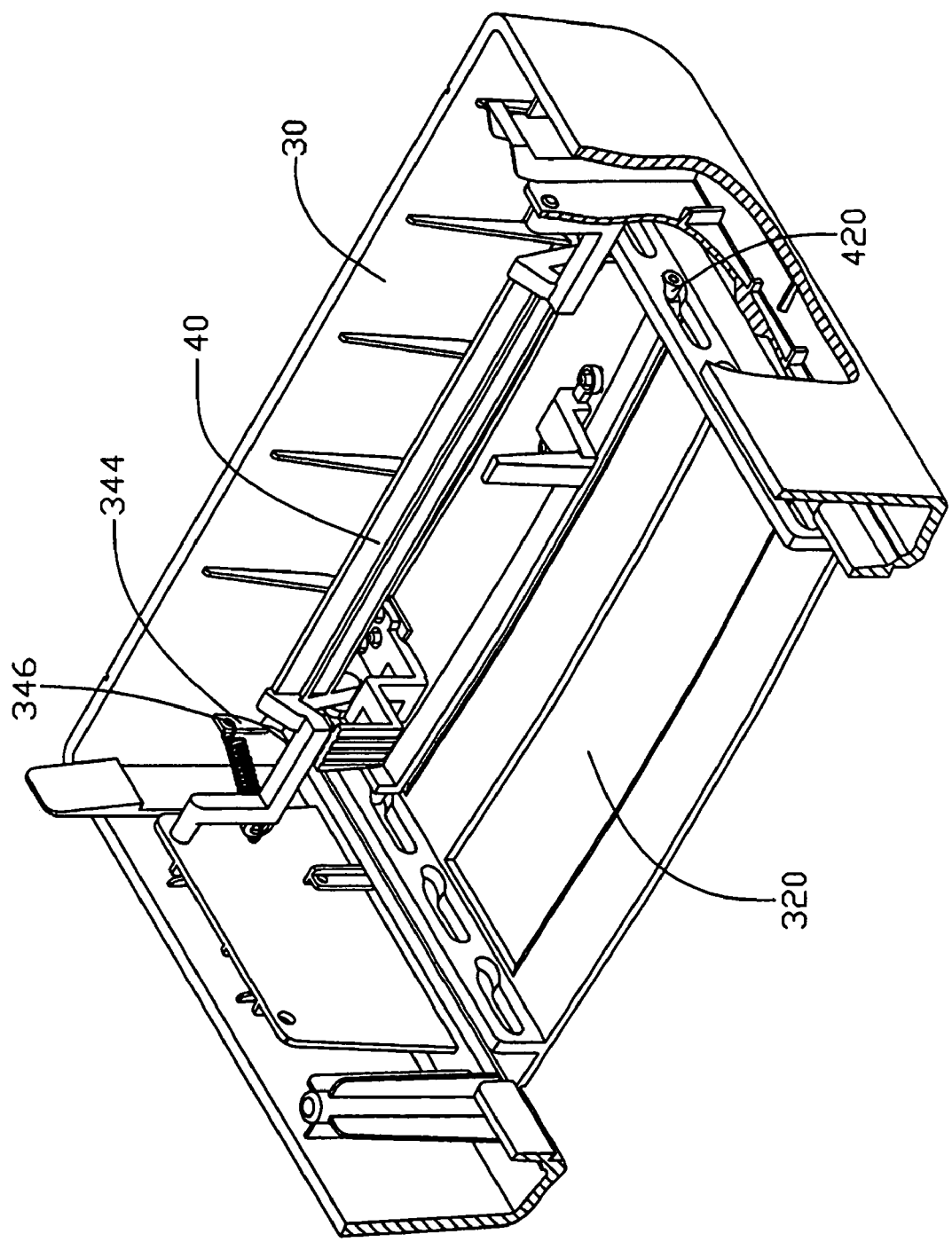
FIG. 3 is an enlarged, assembled view of a bezel and a dustcover member of FIG. 1, but viewed from another aspect.

Referring to FIGS. 1 and 3, the bezel 30 comprises a front board 32 and a pair of side boards 34. A pair of separate openings 320 is defined in the front board 32, for the trays 22 of the optical disk drive 20 sliding into or out of the bezel 30. The front board 32 has a pair of receiving plates 322 at two sides of the opening 320 thereof. A plurality of separate receiving grooves 324 is defined in each receiving plate 322. Each receiving groove 324 comprises a first groove 326 and a vertical second groove 328. The first groove 326 communicates angularly with the second groove 328. Each side board 34 comprises a rectangular locating board 340 adjacent to the corresponding receiving plate 322. A pair of locating holes 342 is defined in the locating board 340. A tab 344 protrudes from the front board 32 near one of the side boards 34. A first fixing hole 346 is defined in the tab 344, for fastening an end of the coil spring 50.

The dustcover member 40 comprises a rotational frame 44, a dustcover 42, an indicator light 47 and a second button 46. The indicator light 47 is mounted to the dustcover 42, for signaling a change in status of the optical disk drive 20. The dustcover 42 is adapted to cover the opening 320 of the bezel 32. A pair of short pivots 421 protrudes from each of opposite sides of the dustcover 42. A sleeve 420 is attached to each short pivot 421. A pair of fixing boards 422 projects from a main body of the dustcover 42, adjacent and parallel to the sides of the dustcover 42. An elliptical fixing groove 424 is defined in each fixing board 422. Three posts 426 protrude from the main body, adjacent to one of the fixing boards 422 and apart from the indicator light 47. A slot 428 is defined in the main body of the dustcover 42.

The frame 44 comprises a crossbeam 440 and a pair of substantially Z-shaped fastening members 442 located at opposite ends of the crossbeam 440. Each fastening member 442 comprises an L-shaped rotating portion 444 and a driving portion 446. A pivot axis 443 is formed on an end of the rotating portion 444, corresponding to the locating hole 342 of the bezel 30. A second fixing hole 445 is defined in an outer side of one of the rotating portions 444, for fixing another end of the coil spring 50. The second fixing hole 445 and the fist fixing hole 346 of the bezel 30 cooperatively mount the coil spring 50 to and between the dustcover member 40 and the bezel 30. The driving portion 446 comprises a slant driving arm 447 and a driving axis 448 locating an end thereof. The driving axis 448 is received in the fixing groove 424 of the dustcover 42.

The second button 46 has a ladder shape. A key 462 is formed on a lower portion of the second button 46, corresponding to the slot 428 of the dustcover 42. The key 462 is used for turning on the first button 24 of the optical disk drive 20. Three through holes 464 are defined in an upper portion of the second button 46. The posts 426 of the dustcover 42 are respectively retained in the holes 464 of the second button 46, and thus, the second button 46 is mounted to dustcover 42.

Figure 2:
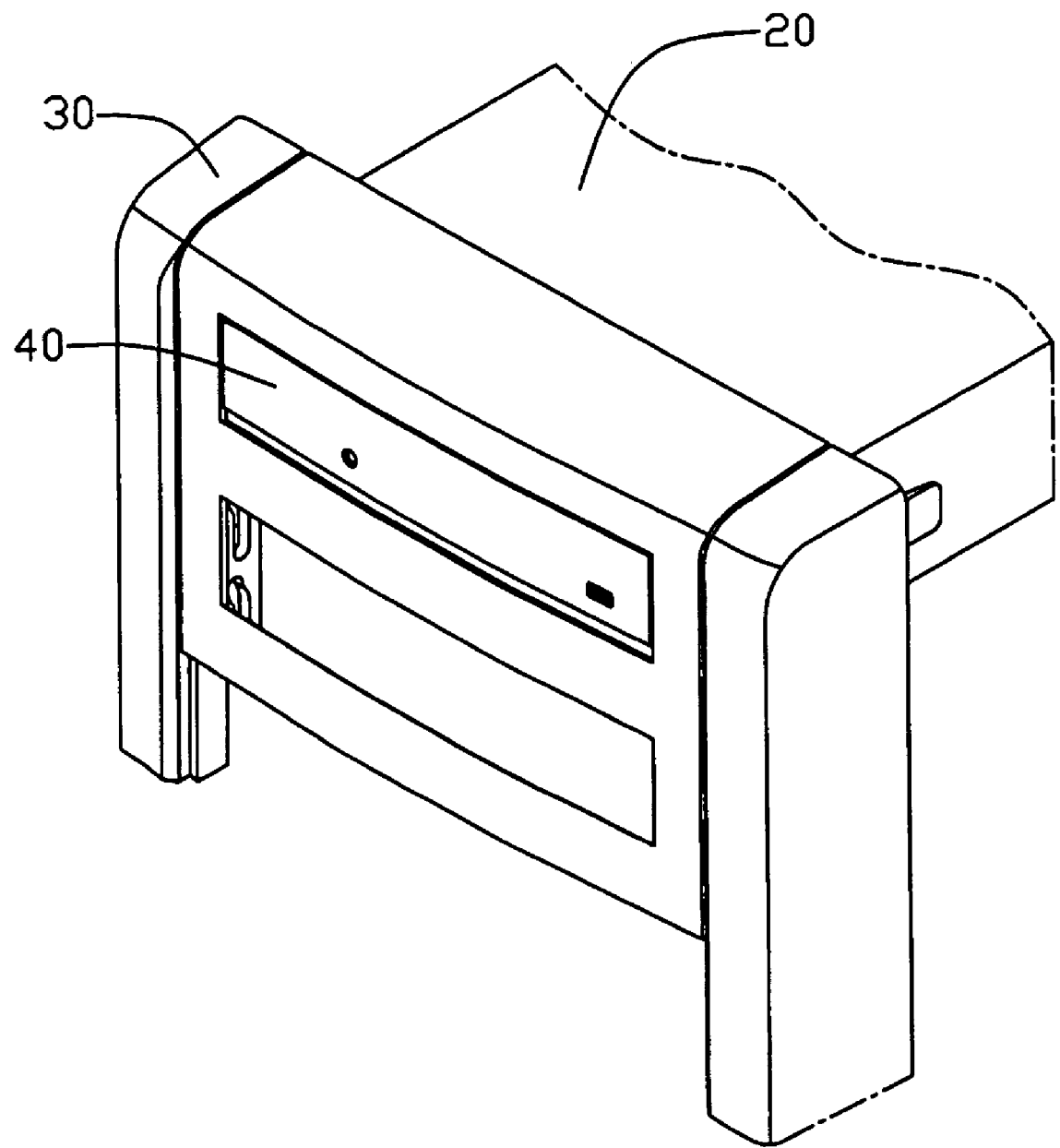
FIG. 2 is an enlarged, assembled view of FIG. 1, but viewed from another aspect.

Referring also to FIGS. 1, 2 and 3, in assembly, the pivot axes 443 of the dustcover member 40 are pivotally mounted to the locating holes 342 of the bezel 30, and the sleeves 420 of the dustcover member 40 are slidably received in the receiving groove 324 of the bezel 30. Thus, the dustcover member 40 is movably attached to the bezel 30. The coil spring 50 is mounted to between the dustcover member 40 and the bezel 30, for driving the dustcover member 40.

Referring to FIG. 4, the optical disk drive 20 is in a closed state, with the dustcover member 40 defined to be in a first position. Referring also to FIG. 1, in the first position, the dustcover 42 of the dustcover member 40 is completely received in the opening 320 of the bezel 30 and flush with the front board 32 of the bezel 30. The second button 46 of the dustcover member 40 abuts against the first button 24 of the optical disk drive 20. The sleeves 420 of the dustcover member 40 are respectively positioned in the first grooves 326 of the receiving grooves 324 of the bezel 30. Simultaneously, the coil spring 50 is in its original state.

Figure 5:
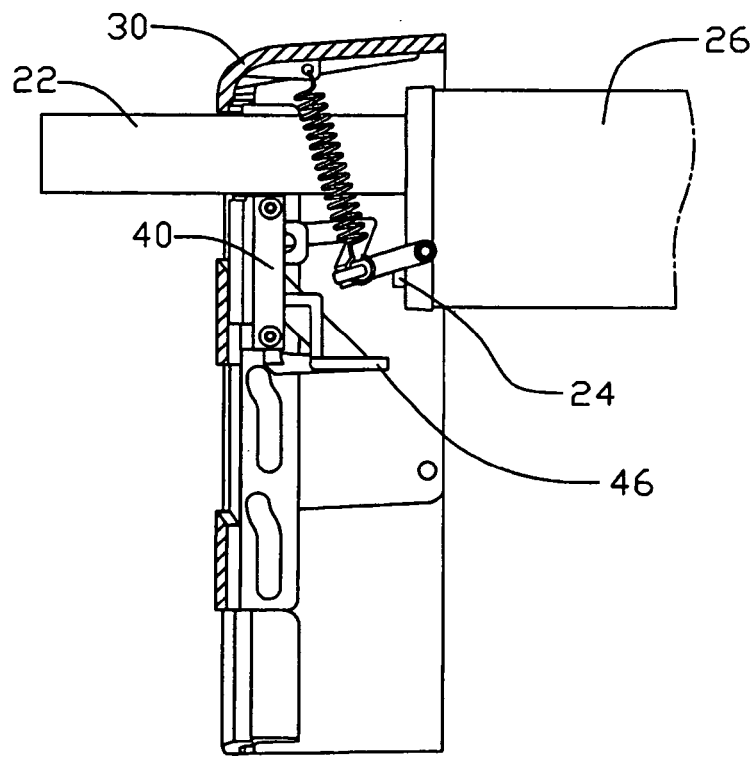
FIG. 5 is similar to FIG. 4, but showing the dustcover device in a second position.
Figure 6:
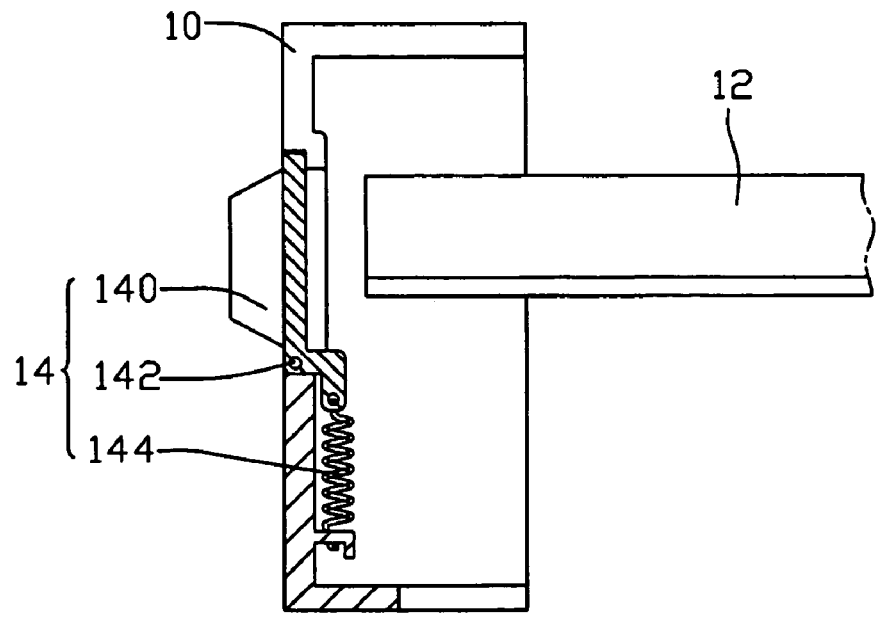
FIG. 6 is a cross-sectional view of a conventional dustcover device, showing the dustcover device in a lock state.
Figure 7:
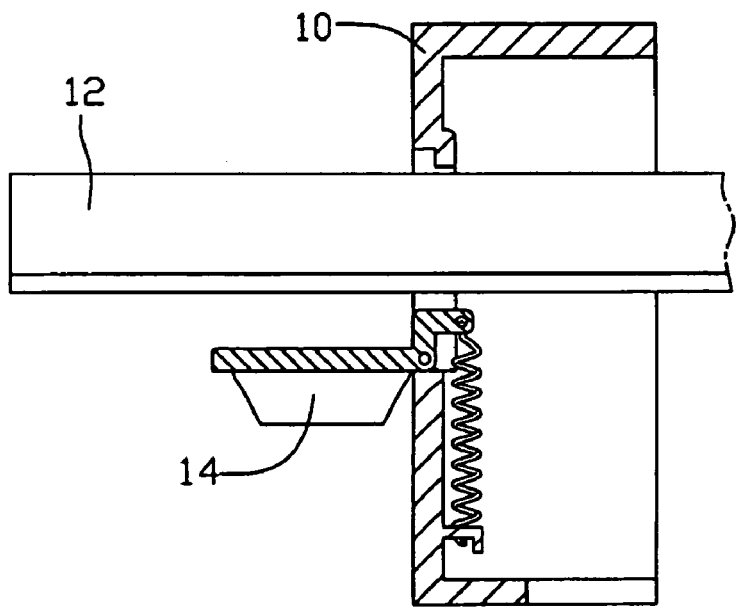
FIG. 7 is similar to FIG. 6, but showing the dustcover device in an unlocked state.

Referring to FIGS. 1 and 5, in use, pressing the key 462 of the second button 46 of the dustcover member 40 causes the first button 24 of the optical disk drive 20 to actuate the optical disk drive 20, and then the tray 22 of the optical disk drive 20 slides out of the case 26 of the optical disk drive 20 and exerts a force on the driving arms 447 of the frame 44 of the dustcover member 40. The frame 44 is pivoted downwardly about the bezel 30, and drives the sleeves 420 of the dustcover 42 to slide downwardly along the receiving groove 324 of the bezel 30 with the dustcover 42 moving downwardly. When the sleeves 420 move downwardly to the second groove 328 of the receiving groove 324, the tray 22 of the optical disk drive 20 slides out from the opening 320 of the bezel 30. Thus, the dustcover member 40 is moved to a second position in which the optical disk drive 20 is in an open state and the optical disk can be loaded into or unloaded from the tray 22. In the second position, the dustcover 42 is located behind the front board 32 of the bezel 30, and an upper edge of the dustcover 42 abuts against the tray 22. Simultaneously, the coil spring 50 is elongated. After the optical disk is loaded or unloaded, the tray 22 is pushed to move into the case 26. The coil spring 50 resumes to its original state and drives the dustcover member 40 to upwardly move from the second position to the first position.

When the dustcover member 40 is in the first position, the dustcover 42 is properly received in the opening 320 of the bezel 30 and flushes with the outline of the bezel 30. When the dustcover member 40 is in the second position, the dustcover 42 is positioned behind the bezel 30. Thus, the dustcover 42 is protected from damage in transportation or in use due to any accidental impact.

While a preferred embodiment in accordance with the present invention have been shown and described, equivalent modifications and changes known to persons skilled in the art according to the spirit of the present invention are considered within the scope of the present invention as defined in the appended claims.

What is claimed is:

1. A dustcover device for protecting a data storage device, the dustcover device comprising:
    a bezel defining an opening and a plurality of receiving grooves;
    a dustcover member comprising a dustcover movably mounted to the bezel and a frame, the frame engaging with the dustcover and rotatablely attached to the bezel, the frame for driving the dustcover to slide downwardly to a lower position along the receiving grooves of the bezel; and
    a resilient member mounted to between the bezel and the dustcover member, for driving the dustcover to upwardly move to an upper position; wherein
    when the dustcover is in the upper position, the dustcover is received in the opening of the bezel for protecting the data storage device from dust, while when the dustcover is in the lower position, the opening is open for using the data storage device.

2. The dustcover device as described in claim 1, wherein the resilient member is a coil spring, a first fixing hole is defined in the bezel for receiving an end of the coil spring, a second fixing hole is defined in the frame for receiving another end of the coil spring.

3. The dustcover device as described in claim 1, wherein at least one pair of sleeves is mounted to opposite sides of the dustcover and movably received in the receiving grooves of the bezel, respectively.

4. The dustcover device as described in claim 1, wherein the frame comprises a crossbeam and a pair of fastening members located opposite sides of the crossbeam, each of the fastening members comprising a driving portion including a slant driving arm and a driving axis, and a rotating portion including a pivot axis.

5. The dustcover device as described in claim 4, wherein the bezel comprises a pair of locating boards, each of the locating boards defining a locating hole for receiving the pivot axis of the frame.

6. The dustcover device as described in claim 4, wherein a pair of fixing grooves is defined in the dustcover, for receiving the driving axes of the frame respectively.

7. The dustcover device as described in claim 1, wherein an indicator light is mounted to the dustcover for signaling a change in status of the data storage device.

8. The dustcover device as described in claim 1, wherein a button is installed to the dustcover for opening the data storage device.

9. The dustcover device as described in claim 1, wherein each of the receiving grooves comprises a first groove and a vertical second groove, the first groove communicating angularly with the second groove.

10. A dustcover device assembly comprising:
an optical disk drive comprising a tray;
a bezel defining an opening for the tray sliding into or out from the optical disk drive;
a dustcover member comprising a dustcover mounted to the bezel and a frame engaging with the dustcover and rotatablely attached to the bezel, the frame including a driving arm; and
a resilient member installed between the bezel and the dustcover member; wherein
when the tray slides into the optical disk drive, the resilient member drives the dustcover to move upwardly to a fist position, while when the tray slides out from the optical disk drive, the tray exerts a force on the driving arm of the dustcover member to cause the dustcover to downwardly move to a second position.

11. The dustcover device assembly as described in claim 10, wherein at least one pair of sleeves is mounted to opposite sides of the dustcover, and the bezel defines a plurality of receiving grooves for movably receiving the sleeves respectively.

12. The dustcover device assembly as described in claim 11, wherein each of the receiving grooves comprises a first groove and a vertical second groove, the first groove communicating angularly with the second groove.

13. The dustcover device assembly as described in claim 10, wherein the frame comprises a crossbeam and a pair of fastening members located opposite sides of the crossbeam, each of the fastening members comprising a driving portion including a driving axis and the driving arm, and a rotating portion including a pivot axis, the driving arm angularly engaging with the crossbeam.

14. The dustcover device assembly as described in claim 13, wherein the bezel comprises a pair of locating boards each defining a locating hole for receiving the pivot axis of the frame.

15. The dustcover device assembly as described in claim 13, wherein a pair of fixing grooves is defined in the dustcover, for receiving the driving axes of the frame respectively.

16. The dustcover device assembly as described in claim 10, wherein the optical disk drive comprises a first button, a second button is mounted to dustcover, the first and second buttons cooperatively opening the optical disk drive.

17. An electronic appliance comprising:
a bezel defining at least one opening;
an electronic device having an ejectable tray in alignment with said opening;
a dustcover member mounted inside the bezel, the dustcover member comprising a dustcover slidable between a first position in which the dustcover shields said opening, and a second position in which the dustcover exposes said opening;
at least one resilient member connecting the dustcover member and the bezel;
wherein the ejectable tray drives the dustcover member to slide away from said opening, and said resilient member draws the dustcover member back to the first position.

18. The electronic appliance as claimed in claim 17, wherein the bezel forms two plates in the vicinity of opposite ends of said opening respectively, at least one pair of receiving grooves is defined in the plates respectively, at least one pair of pivots extends from opposite sides of the dustcover respectively to be pivotally and slidably received in said grooves.

19. The electronic appliance as claimed in claim 18, wherein each of said grooves has an upper portion thereof extending slantingly rearwardly, and the rest portion extending straightly downwardly.

20. The electronic appliance as claimed in claim 17, wherein the dustcover member further comprises a frame, the frame comprises a slanted driving portion having two opposite upper ends pivotally and slidably mounted to the dustcover, and a rotating portion pivotally connected to the bezel.

21. An electronic appliance comprising:
an enclosure having a bezel defining at least one opening to communicate outside of said enclosure with inside thereof;
an internal device disposed next to said at least one opening and exposable thereto;
a dustcover attached to said bezel, and movable between a first position where said dustcover fully shields said opening with a side thereof flush with said bezel and a second position where said dustcover moves away from said opening to expose said internal device neighboring said opening to said outside of said enclosure;
a frame mounting to said bezel and controllably engagable with said dustcover, and rotation of said frame resulting in movement of said dustcover between said first and second positions of said dustcover; wherein
said side of dustcover substantially faces a same direction during movement of said dustcover between said first and second positions thereof.

22. The electronic appliance as claimed in claim 21, wherein said rotation of said frame is drivable by a tray of said internal device when said tray moves against a driving portion of said frame.

* * * * *